W. H. WARD.
CARRIAGE AXLE.
No. 179,237.  Patented June 27, 1876.
FIG. I.
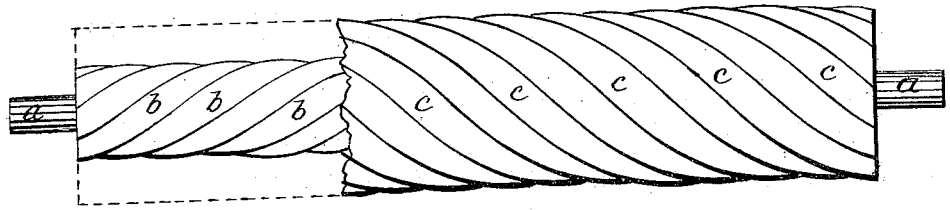
FIG. II.
FIG. III.
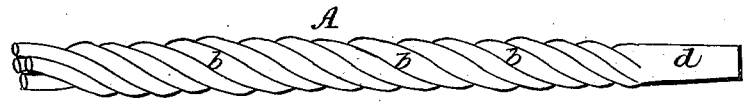
WITNESSES.
F. B. Townsend,
J. A. Rutherford
INVENTOR.
William H. Ward,
by Johnson and Johnson,
his Attorneys.

UNITED STATES PATENT OFFICE.

WILLIAM H. WARD, OF ALEXANDRIA, VIRGINIA.

IMPROVEMENT IN CARRIAGE-AXLES.

Specification forming part of Letters Patent No. 179,237, dated June 27, 1876; application filed June 8, 1875.

*To all whom it may concern:*

Be it known that I, WILLIAM H. WARD, formerly of Auburn, New York, now of Alexandria, in the county of Alexandria and State of Virginia, have invented certain new and useful Improvements in Twist Laminated Axles; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My object is to obtain a strong and elastic axle for carriages and cars by constructing it of two or more layers of rods running spirally in opposite directions upon a straight core-rod, with a short portion of each end welded into a homogeneous mass, leaving the intermediate spirally-wound rods unwelded, and bound by the welded ends compactly, one upon the other and upon the core-rod, thereby producing an axle having solid ends for the journals and wheel-seats, with its intermediate length rendered sufficiently elastic to yield to any undue or sudden strain by the bending or giving of the rods with and upon each other throughout that portion which is not consolidated, and thereby avoiding the usual crystallization of railway axles.

In the accompanying drawings, Figure 1 represents an axle, showing the different spirally-wound layers, and before subjecting the ends of the axle to the welding operation. Fig. 2 shows the axle complete, with the ends of the spirally-formed layers welded to compact the rods and form the journals and wheel-seats; and Fig. 3, a portion of a spirally-formed elastic axle welded without a core-rod, and with the twists running in the same direction.

In forming the axle two or more layers of spirally-twisted rods, *b c*, are wound upon a straight core-rod, *a*, in opposite directions, and the ends welded together to consolidate and reduce them to form the bearings and wheel *d d*, while between the welded portions the rods are unwelded, as at A, to form an elastic body to the axle, in order that it may yield to undue or sudden strains, but preserving its compactness, and giving it greater strength than if the rods were welded throughout their length. In a partially-welded axle of spirally-wound rods, they may be composed of separate right and left twisted layers wound upon a straight core-rod, as in Fig. 1, or of rods wound spirally in a mass without a core-rod, as in Fig. 3; but in either case the rods form a compact body for the axle, with a sufficient length of each end welded to form the bearings and seats for the wheels, and give a solid union to the rods at the bearing ends. In this way a very desirable axle is formed, in which the body can have a certain amount of spring without liability to crystalize or break in any portion of its entire length. In this case the welded ends only will form laminated bearings with a joining body of separate spirally-wound rods of great united strength.

I claim—

An axle of spirally-wound layers of rods, welded at their ends to form the wheel-seats and axle-bearings, and unwelded between such bearings to form an elastic body, substantially as and for the purpose herein set forth.

In testimony that I claim the foregoing I have affixed my signature in presence of two witnesses.

WILLIAM H. WARD.

Witnesses:
A. E. H. JOHNSON,
J. W. HAMILTON JOHNSON.